A. M. LE PIERRE.
NUT LOCK.
APPLICATION FILED JUNE 12, 1914.
1,115,694.
Patented Nov. 3, 1914.
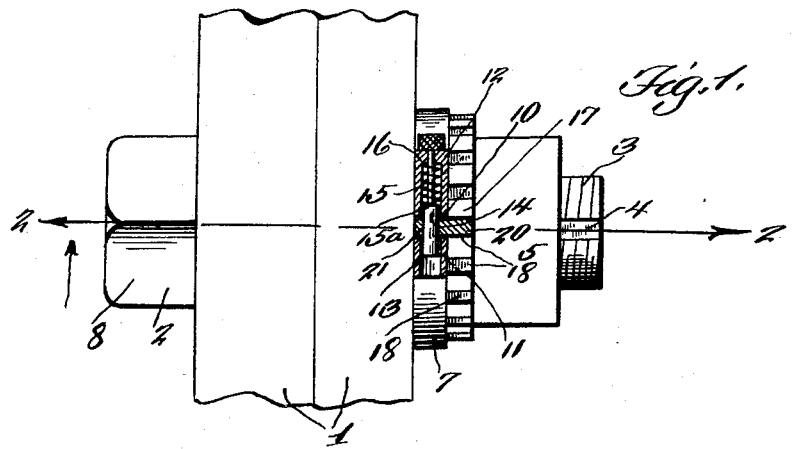
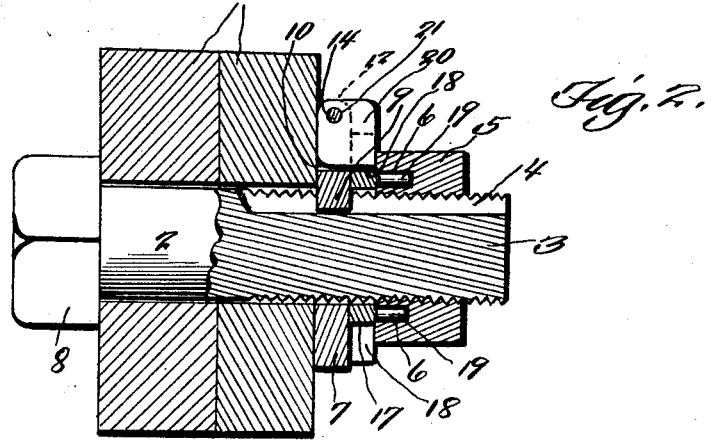
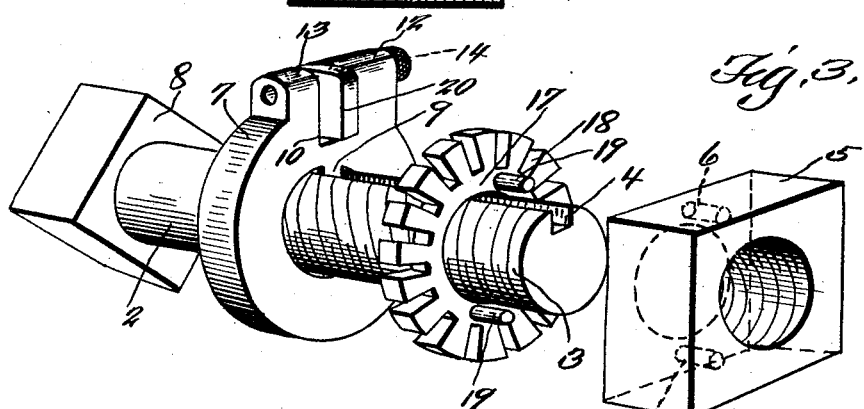
Witnesses
A. R. Wolfe.
Frances G. Brawell.
Inventor
Auguste M. Le Pierre,
By D. Swift & Co.,
his Attorneys

UNITED STATES PATENT OFFICE.

AUGUSTE MARIE LE PIERRE, OF KORBEL, CALIFORNIA.

NUT-LOCK.

1,115,694.  Specification of Letters Patent.  Patented Nov. 3, 1914.

Application filed June 12, 1914. Serial No. 844,688.

*To all whom it may concern:*

Be it known that I, AUGUSTE MARIE LE PIERRE, a citizen of the United States, residing at Korbel, in the county of Humboldt and State of California, have invented a new and useful Nut-Lock; and I do hereby declare the following to be a full, clear, and exact description of the invention, such as will enable others skilled in the art to which it appertains to make and use the same.

This invention relates to an improved useful nut lock.

As one of the objects of the invention it is the aim to simplify and improve the construction of nut lock, set forth and claimed and illustrated in the patent issued April 7, 1914, No. 1,092,534.

Another object of the invention is to provide a nut lock comprising improved features of construction, one of which is the provision of an annular plate washer having radial slots, arranged circumferentially, any one of which is designed to receive a key pivoted upon a second plate, which is keyed to the bolt, the plate washer having lugs to engage recesses of the nut.

In practical fields the details of construction may be subjected to alterations, falling within the scope of what is claimed.

The invention comprises further features and combinations of parts, as hereinafter set forth, shown in the drawings, and claimed.

In the drawings, Figure 1 is a plan view of the nut lock construction embodying the features of the invention. Fig. 2 is a sectional view longitudinally on line 2—2 of Fig. 1. Fig. 3 is a view showing the parts of the construction in perspective and disassembled.

Referring more especially to the drawings, 1 designates two members to be bolted together, while 2 denotes the bolt, the shank 3 of which is provided with a keyway 4, whereas 5 marks the usual nut, which is provided with oppositely arranged cylindrical depressions 6. The members 1 are disposed between the plate washer 7 and the head 8 of the bolt. The plate washer 7 is provided with a lug 9 to engage the keyway or groove 4 of the shank 3 of the bolt, to prevent the plate washer from turning. The plate washer is also provided with a radial groove or slot 10, and adjoining this slot upon the periphery of the plate washer 7 are lugs 12 and 13 having cylindrical bores alined with one another, the slot 10 being between said lugs. Mounted in said parts is a spring retained bolt 14, the spring 15 of which acts between the shoulder 15ª of said bolt and the shoulder 16 of one of the lugs. Also mounted upon the shank of the bolt is a second plate washer 17, which is provided with a plurality of radial slots 18 arranged circumferentially. Projecting from the plate washer 17 in a lateral direction is a pair of lugs 19, which enter the cylindrical depressions 6 of the nut 5. A key 20 is provided having an aperture 21. This key is designed to be arranged in the slot 10, and one of the slots 18, in such wise that the spring bolt 14 may be inserted through the aperture 21 of the key, thereby locking the plate washer 17 to the plate washer 7.

In arranging the nut lock, the bolt shank is inserted through the members 1, and the plate washer 7 placed over the shank so that the lug 9 will engage the keyway 4 of the bolt. The plate washer 17 is then placed upon the shank and also the nut 5, so that the lugs 19 will engage the cylindrical depressions 6. Subsequently to which, the plate washer 17 and the nut 5 are screwed tight against the plate washer 7, in such wise that one of the slots 18 will register with the slot 10. The key 20 is then inserted in the slot 10, the spring retained bolt having been pulled back, so that the shank of said bolt will pass through the aperture 21. In this manner the nut lock construction is rendered firm and secure, but it, at the same time, may be easily and manually unlocked. In arranging the parts of the nut lock construction, the nut is adjusted toward the members 1 so as to engage the key and hold the same between one of the members 1 and the nut.

Having set forth the invention, what is claimed as new and useful is:—

1. In combination, a bolt having a keyway in its shank, a nut threaded on the shank and provided with oppositely arranged depressions in one of its faces, said bolt shank designed to pass through a pair of members to be clamped, a plate washer having a radial slot and provided with an inwardly extending lug to engage the keyway, a spring retained bolt carried by the periphery of said plate washer and extending transversely across the slot, a second plate washer between the first washer and said nut and provided with lugs to engage said depressions and having a plurality of radial slots arranged circumferentially, and a member anchored upon the spring retained bolt and in the slot of the first washer and engaging one of the radial slots of the second washer.

2. In combination, a bolt having a keyway in its shank and designed to pass through two members to be clamped, a plate washer having means to engage the keyway to prevent its rotation and provided upon its periphery with two lugs having cylindrical bores, a spring retained bolt in said bores, said washer having a radial slot extending between the two lugs, the spring retained bolt extending transversely thereof, a nut threaded on the bolt shank, a second plate washer having means of engagement with the nut in order to rotate therewith and provided with a plurality of radial slots arranged circumferentially, and a key plate arranged in the slot of the first plate washer and engaging one of the slots of the second washer and provided with an aperture through which the spring retained bolt extends, said nut adapted to engage the key plate and hold it between one of the members and the nut.

In testimony whereof I have signed my name to this specification in the presence of two subscribing witnesses.

AUGUSTE MARIE LE PIERRE.

Witnesses:
F. M. BRODERICK,
H. L. GILMORE.

Copies of this patent may be obtained for five cents each, by addressing the "Commissioner of Patents Washington, D. C."